US008219762B1

(12) United States Patent
Shavit et al.

(10) Patent No.: US 8,219,762 B1
(45) Date of Patent: Jul. 10, 2012

(54) COMPUTER SYSTEM AND METHOD FOR LEASING MEMORY LOCATION TO ALLOW PREDICTABLE ACCESS TO MEMORY LOCATION

(75) Inventors: Nir N. Shavit, Cambridge, MA (US); Ori Shalev, Giv'at Shmuel (IL)

(73) Assignee: Oracle America, Inc., Redwood City, CA (US)

( * ) Notice: Subject to any disclaimer, the term of this patent is extended or adjusted under 35 U.S.C. 154(b) by 1455 days.

(21) Appl. No.: 10/918,062

(22) Filed: Aug. 13, 2004

(51) Int. Cl.
*G06F 12/00* (2006.01)
*G06F 13/00* (2006.01)
(52) U.S. Cl. ......... 711/152; 711/100; 711/147; 711/154
(58) Field of Classification Search .................. 711/152, 711/100, 147, 148, 154
See application file for complete search history.

(56) References Cited

U.S. PATENT DOCUMENTS

| | | | | |
|---|---|---|---|---|
| 4,561,051 A * | 12/1985 | Rodman et al. | ............... | 711/152 |
| 4,858,116 A * | 8/1989 | Gillett et al. | ................... | 711/155 |
| 5,301,290 A | 4/1994 | Tetzlaff et al. | | |
| 5,428,761 A | 6/1995 | Herlihy et al. | | |
| 5,875,342 A * | 2/1999 | Temple | .......................... | 710/260 |
| 5,892,955 A | 4/1999 | Ofer | | |
| 5,991,845 A | 11/1999 | Bohannon et al. | | |
| 6,370,625 B1 | 4/2002 | Carmean et al. | | |
| 6,745,274 B1 | 6/2004 | Snyder et al. | | |
| 6,782,452 B2 | 8/2004 | Williams, III | | |
| 6,958,507 B2 | 10/2005 | Atwood et al. | | |
| 2002/0078307 A1 | 6/2002 | Zahir | | |
| 2002/0188590 A1* | 12/2002 | Curran et al. | ..................... | 707/1 |
| 2004/0015642 A1 | 1/2004 | Moir et al. | | |
| 2005/0038964 A1 | 2/2005 | Hooper et al. | | |
| 2006/0036850 A1 | 2/2006 | Enokida | | |

OTHER PUBLICATIONS

Maurice Herlihy, A Methodology for Implementing Highly Concurrent Data Objects, ACM Transactions on Programming Languages and Systems, vol. 15, No. 5, Nov. 1993, pp. 745-770.
Nir Shavit, et al. Elimination Trees and the Construction of Pools and Stacks. A preliminary version of this paper appeared in the *Proceedings of the 7th Annual Symposium on Parallel Algorithms and Architectures (SPAA)*, Feb. 28. 1996, pp. 0-29.
Thomas E. Anderson. The Performance of Spin Lock Alternatives for Shared-Memory Multiprocessors. IEEE Transactions on Parallel and Distributed Systems, vol. 1, No. 1, Jan. 1990, pp. 6-16.
Maged M. Michael. Safe Memory Reclamation for Dynamic Lock-Free Objects Using Atomic Reads and Writes. PODC 2002 Jul. 21-24, 2002, Monterey, CA.
John M. Mellor-Crummey, et al. Algorithms for Scalable Synchronization on Shared-Memory Multiprocessors. ACM Transactions on Computer Systems, vol. 9, No. 1, Feb. 1991, pp. 21-65.
Maged M. Michael, et al. Nonblocking Algorithms and Preemption-Safe Locking on Multiprogrammed Shared Memory Multiprocessors. Journal of Prallel and Distributed Computing 51, Article No. PC981446, 1998, pp. 1-26.

(Continued)

*Primary Examiner* — Tuan V. Thai
(74) *Attorney, Agent, or Firm* — Osha • Liang LLP

(57) ABSTRACT

A synchronization technique for shared-memory multiprocessor systems involves acquiring exclusive ownership of a requested memory location for a predetermined, limited duration of time. If an "owning" process is unpredictably delayed, the ownership of the requested memory location expires after the predetermined duration of time, thereby making the memory location accessible to other processes and requiring the previous "owning" process to retry its operations on the memory location. If the "owning" process completes its operations on the memory location during the predetermination duration of time, the ownership of the memory location by the "owning" process is terminated and the memory location becomes accessible to other processes.

9 Claims, 8 Drawing Sheets

OTHER PUBLICATIONS

Maurice P. Herlihy. et al. Linearizability: A Correctness Condition for Concurrent Objects. ACM Transactions on Programming Languages and Systems, vol. 12, No. 3, Jul. 1990, pp. 463-492.

Maurice Herlihy, et al. The Repeat Offender Problem: A Mechanism for Supporting Dynamic-Sized, Lock-Free Data Structures.15 pages.

Maurice Herlihy, et al. Scalable Concurrent Counting. A preliminary version of this report appeared in the *Proceedings of the 3rd Annual ACM Symposium on Parallel Algorithms and Architectures*, Jul. 1992, San Diego, CA [16], pp. 1-31.

Nir Shavit, et al. A Steady State Analysis of Diffracting Trees. Jul. 15, 1997, pp. 1-26.

Nir Shavit, et al. Diffracting Trees. A preliminary version of this work appeared in the *Proceedings of the Annual Symposium on Parallel Algorithms and Architectures (SPAA)*. Jun. 1994, pp. 0-49.

Nir Shavit, et al. Combining Funnels: A Dynamic Approach to Software Combining. A preliminary version of this work appeared in Principals of Distributed Computing (PODC98). Jul. 6, 1999, pp. 1-30.

Beng-Hong Lim, et al. Waiting Algorithms for Synchronization in Large-Scale Multiprocessors. ACM Transactions on Computer Systems, vol. 11, No. 3, Aug. 1993, pp. 1-39.

Maged M. Michael, et al. Simple, Fast, and Practical Non-Blocking and Blocking Concurrent Queue Algorithms. 8 pages.

Ravi Rajwar, et al. Speculative Lock Elision: Enabling Highly Concurrent Multithreaded Execution. In the *Proceedings of the 34th International Symposium on Microarchitechture (MICRO)*, Dec. 3-5, 2001, Austin, Texas, 12 pages.

John D. Valois. Implementing Lock-Free Queues. In *Proceedings of the Seventh International Conference on Parallel and Distributed Computing Systems*, Las Vegas, NV, Oct. 1994, pp. 1-9.

Sundeep Prakash, et al. Non-Blocking Algorithms for Concurrent Data Structures. Jul. 1, 1991, pp. 1-40.

John M. Mellor-Crummey, et al. Algorithms for Scalable Synchronization on Shared-Memory Multiprocessors. Jan. 1991, 42 pages.

Peter Magnusson, et al. Queue Locks on Cache Coherent Multiprocessors. 7 pages.

Travis S. Craig. Building FIFO and Priority-Queuing Spin Locks from Atomic Swap. Feb. 1, 1993, pp. 1-29.

Yehuda Afek, et al. Atomic Snapshots of Shared Memory. pp. 1-21. A Preliminary version of this paper appeared in the *Proceedings of the 9th Annual ACM Symposium on Principles of Distributed Computing*, (Quebec City, Quebec, August) ACM, New York, 1990, pp. 1-14.

Ole Agesen, et al. DCAS-Based Concurrent Deques. 10 pages.

Maurice Herlihy. Wait-Free Synchronization. ACM Transactions on Programming Languages and Systems, vol. 11, No. 1, Jan. 1991, pp. 124-149.

Mark Moir. Practical Implementations of Non-Blocking Synchronization Primitives.10 pages.

Maurice Herlihy, et al. Obstruction-Free Synchronization: Double-Ended Queues as an Example. 8 pages.

Gray, et al,; "Leases: An Efficient Fault-Tolerant Mechanism for Distributed File Cache Consistency"; ACM pp. 202-204, 1989.

Handy, J., the Cache Memory book, 2nd edition, 1998, pp. 29-31, 67, 138-141, 146-147.

* cited by examiner

| Address 902 | Processor 904 | Thread Context 906 | Timeout 908 | Waiting Processor 910 | Waiting Context 912 | Waiting Timeout 914 | Waiting Operation 916 | Waiting Value 918 |
|---|---|---|---|---|---|---|---|---|
| | | | | | | | | |
| | | | | | | | | |

Lease Table 900

*FIG. 8*

COMPUTER SYSTEM AND METHOD FOR LEASING MEMORY LOCATION TO ALLOW PREDICTABLE ACCESS TO MEMORY LOCATION

CROSS-REFERENCE TO RELATED APPLICATIONS

This application claims priority from U.S. Provisional Patent Application No. 60/554,197, filed Mar. 17, 2004.

BACKGROUND OF INVENTION

A modern computer system has at least a microprocessor and some form of memory. Generally, the processor processes retrieves data stored in the memory, processes/uses the retrieved data to obtain a result, and stores the result in the memory.

One type of computer system uses a single processor to perform the operations of the computer system. In such a single processor (or "uniprocessor") computer system, incoming memory requests to memory occur serially. However, as described below with reference to FIG. 1, in a computer system that uses multiple processors at least partly in order to increase data throughput, due to parallel processing (i.e., simultaneous processing by two or more processors), memory shared by multiple processors may receive multiple memory requests that overlap in both time and space.

FIG. 1 shows a typical multiprocessor system (100). In FIG. 1, multiple processors (102a, 102b) share a memory (106), where the memory (106) includes memory locations (106a-106n). An important consideration in multiprocessor system design involves the potential of two or more processors attempting to access and/or store data in the same memory location at the same time. Thus, designers have implemented, using both software and/or hardware, various "synchronization" techniques to address the issue of threads (i.e., sequences of instructions being processed by a processor) concurrently attempting to access the same memory location.

Synchronization can be implemented by a processor "blocking" other processors from accessing or storing data to a particular memory location, i.e., a processor maintains exclusive, uninterruptible ownership of a particular memory location. However, maintaining exclusive ownership of a memory location results in a high number of failures and deadlocks, particularly for large-scale multiprocessor systems (e.g., systems having thousands of processors running in parallel). Such large-scale multiprocessor systems tend to require higher levels of robustness and tolerance than that provided by blocking synchronization techniques due to increased delays and fluctuations in communication time and the effects of fast context switching typical of large-scale multiprocessor systems.

At least partly in order to address the drawbacks of blocking synchronization techniques, "non-blocking" synchronization techniques have emerged that allow multiple processors to access concurrent objects in a non-mutually exclusive manner to meet the increased performance requirements of large-scale multiprocessor systems. The concept of non-blocking may be implemented through hardware and software components in a variety of ways. For example, in the multiprocessor system shown in FIG. 2, a combination of instruction primitives and registers is used to achieve non-blocking synchronization in a multiprocessor system.

In FIG. 2, a processor (102a) sends a Load-Linked request to a controller (104a) to load a value from a memory location (e.g., (106a)), which, in turn, sets a bit associated with the memory location. The controller (104a) issues a response to the request indicating that the value of the memory location has been successfully loaded. Once the value has been successfully loaded, the processor (102a) executes one or more instructions to manipulate the loaded value. The processor (102a) then issues a Store-Conditional request that attempts to store the manipulated value back to the memory location (e.g., (106a)). However, the value is only stored to that memory location if the associated bit in the controller (104a) has not been unset (i.e., if no other processor has written to the memory location since the Load-Linked request). If the Store-Conditional request succeeds, this indicates that all three steps occurred atomically (i.e., as a single, uninterrupted sequence). On the other hand, if the Store-Conditional request fails, the data is not stored in that memory location and the Load-Linked request must be retried.

The implementation of the Load-Linked/Store-Conditional primitives in non-blocking synchronization has two distinct features. First, all Load-Linked requests are required to succeed. Secondly, all Load-Linked requests require some sort of recording (or tracking).

Recording Load-Linked requests may require that a controller notify all processors that initiated Load-Linked requests whenever a Store-Conditional request invalidates them, essentially mimicking a cache coherence protocol. Alternatively, a record may be maintained in each controller for every initiated Load-Linked request. In this case, the Load-Linked request is only removed from the record of the controller once a successful Store-Conditional request occurs. Because the completion of a Store-Conditional request cannot be forecasted, the latter option requires support for lists of unbounded size, which complicates controller design and creates performance bottlenecks whenever a Load-Linked request is initiated.

Another type of non-blocking synchronization technique involves the use of Compare&Swap primitives. A Compare&Swap operation typically accepts three values, or quantities: a memory address A, a comparison value C, and a new value N. The operation fetches and examines the contents V of memory at address A. If those contents V are equal to C, then N is stored into the memory location at address A, replacing V. A boolean return value indicates whether the replacement occurred. Depending on whether V matches C, V is returned or saved in a register for later inspection (possibly replacing either C or N depending on the implementation).

The Load-Linked/Store-Conditional and Compare&Swap operations described above are recognized as types of Read-Modify-Write operations, which are generally operations that read a value of a memory location (e.g., a single word having a size that is system specific), modify the memory location, and write the modified value back to the memory location. Typical Read-Modify-Write operations do not hold ownership and must optimistically check to make sure they were not interrupted, thereby possibly introducing implementation and user-level problems that require costly solutions and/or weakened semantics. Further, these non-blocking synchronization implementations put the burden of coordination on the threads and are typically incompatible with fast context-switching, which is an important technology often used in hiding memory access latencies in large-scale multiprocessor systems.

SUMMARY OF INVENTION

According to one aspect of one or more embodiments of the present invention, a computer system comprises: a first processor and a second processor capable of executing processes concurrently; and a set of memory locations shared by the first processor and the second processor, where, in response to a request by the first processor to perform a read-modify-write synchronization operation on a memory location in the set of memory locations, the set of memory locations is transiently restricted from being accessed by the second processor.

According to another aspect of one or more embodiments of the present invention, a shared-memory multiprocessor computer system having instructions for synchronizing operations on memory, the instructions comprising instructions to: request access to a memory location in a set of memory locations; if the access is granted, restrict access to the set of memory locations for a predetermined amount of time; and perform a read-modify-write operation on the memory location during the predetermined amount of time.

According to another aspect of one or more embodiments of the present invention, a method of performing computer system operations comprises: attempting to access a value in a memory location in a set of memory locations by a process in a shared-memory multiprocessor system; if the memory location is accessible, restricting another process from accessing the set of memory locations for a predetermined amount of time; and during the predetermined amount of time, attempting to perform a read-modify-write operation on the memory location.

According to another aspect of one or more embodiments of the present invention, a computer system comprises: a plurality of processors; a memory shared by the plurality of processors, the memory having a set of memory locations; and a controller configured to (i) in response to a request by one of the plurality of processors to perform a read-modify-write operation on a memory location in the set of memory locations, selectively grant the one of the plurality of processors access to the memory location for a predetermined amount of time, and (ii) restrict access to the set of memory locations by another one of the plurality of processors during the predetermined amount of time.

Other aspects and advantages of the invention will be apparent from the following description and the appended claims.

BRIEF DESCRIPTION OF DRAWINGS

FIG. 8 shows a controller structure in accordance with an embodiment of the present invention.

DETAILED DESCRIPTION

Embodiments of the present invention relate to a technique for acquiring exclusive ownership of a location in memory for a predetermined, limited duration of time (i.e., a "lease interval"), where the ownership is transient and may expire if a thread is unpredictably delayed. Such a technique is referred to as "transient blocking synchronization." Embodiments of the present invention also relate a set of synchronization operations that support the implementation and use of transient blocking synchronization.

In general, transient blocking synchronization enables a process to temporarily "lease," i.e., have access to, an individual memory location in a manner that ensures that another process may gain access to the individual memory location is if the process is unpredictably delayed. In other words, if the process is unpredictably delayed, the "lease" essentially "runs out," thereby freeing the individual memory location to other processes. Alternatively, the individual memory location may also be "unleased" if the process completes its operations on the individual memory location prior to the "lease" expiring. Further, the lease may expire if a programmer specifies a lease period that is shorter than the amount of time required to execute a particular calculation.

Figure 1:
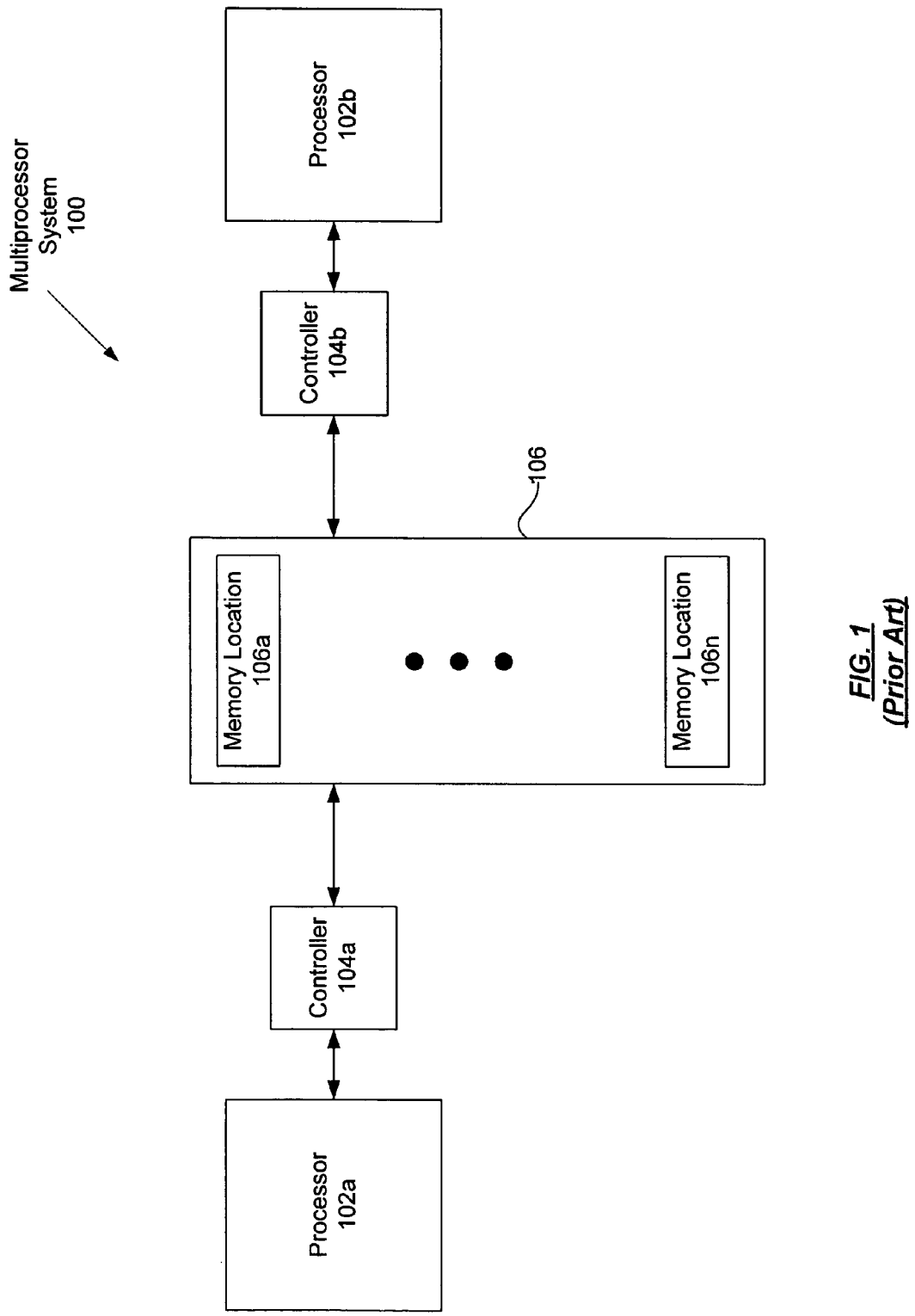
FIG. 1 shows a portion of a typical shared-memory multiprocessor system.
Figure 2:
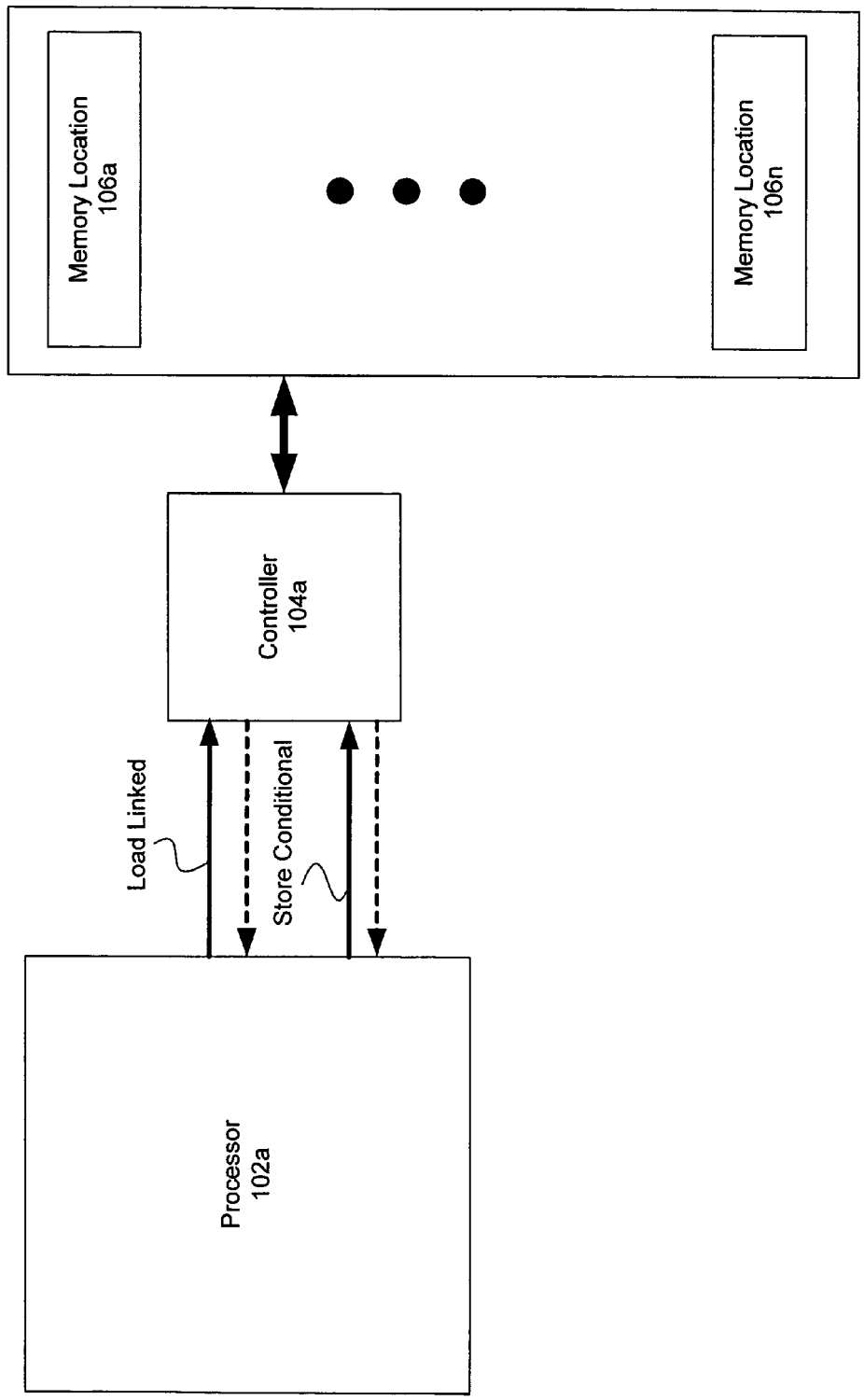
FIG. 2 shows a portion of a typical shared-memory multiprocessor system that uses non-blocking synchronization.
Figure 3:
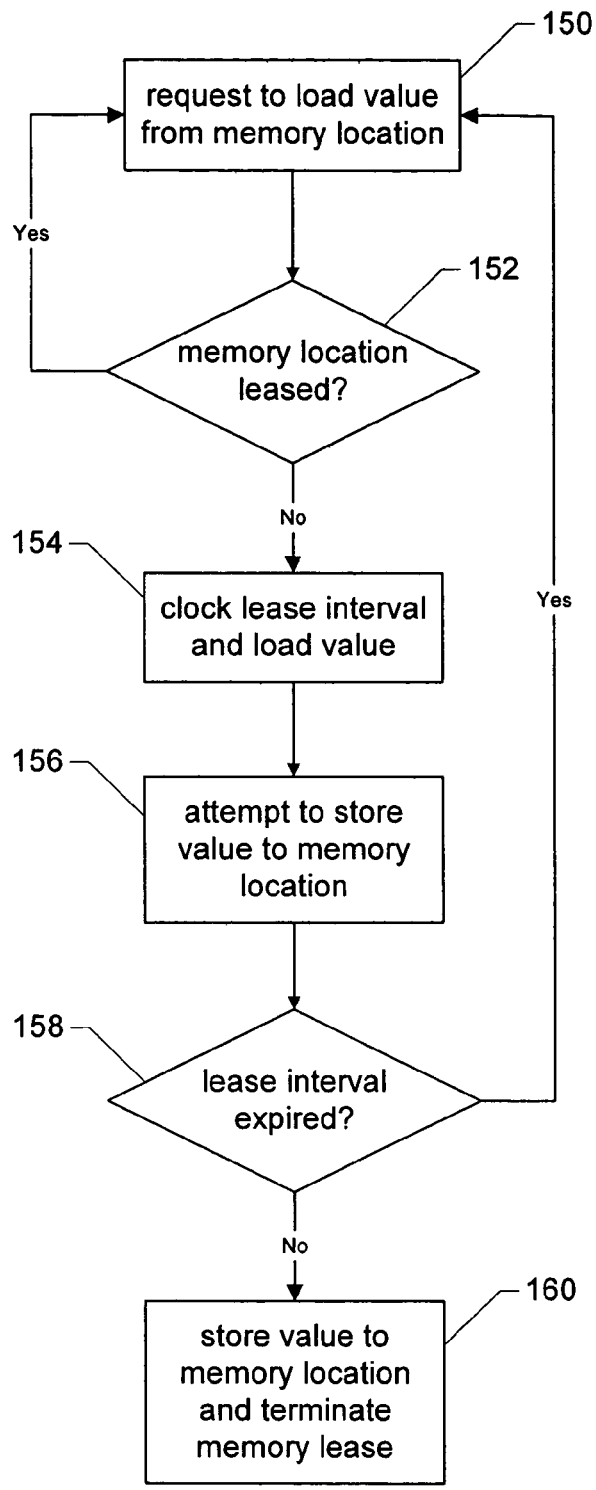
FIG. 3 shows a flow process in accordance with an embodiment of the present invention.

FIG. 3 shows an exemplary transient blocking synchronization flow process in accordance with an embodiment of the present invention. In FIG. 3, the flow process begins with a request to load a value from a memory location (Step 150). If the memory location is leased (i.e., already "owned" by another thread) (Step 152), the request to load the value may be retried (Step 150). Otherwise, if the memory location is not leased (Step 150), a memory lease is acquired, a lease interval is clocked, and the value is loaded (Step 154). While the memory lease is valid, requests from other processors to access the memory location specified by the memory lease will be unsuccessful. At some point in time after the load request, a store request is issued to attempt to store a value back to the memory location (Step 156). If the lease interval has already expired at the time of the store request (Step 158), the process restarts and the load request is retried (Step 150). Otherwise, if the lease interval has not expired at the time of the store request (Step 158), the value is stored in the memory location and the lease of the memory location is terminated (Step 160).

Figure 4:
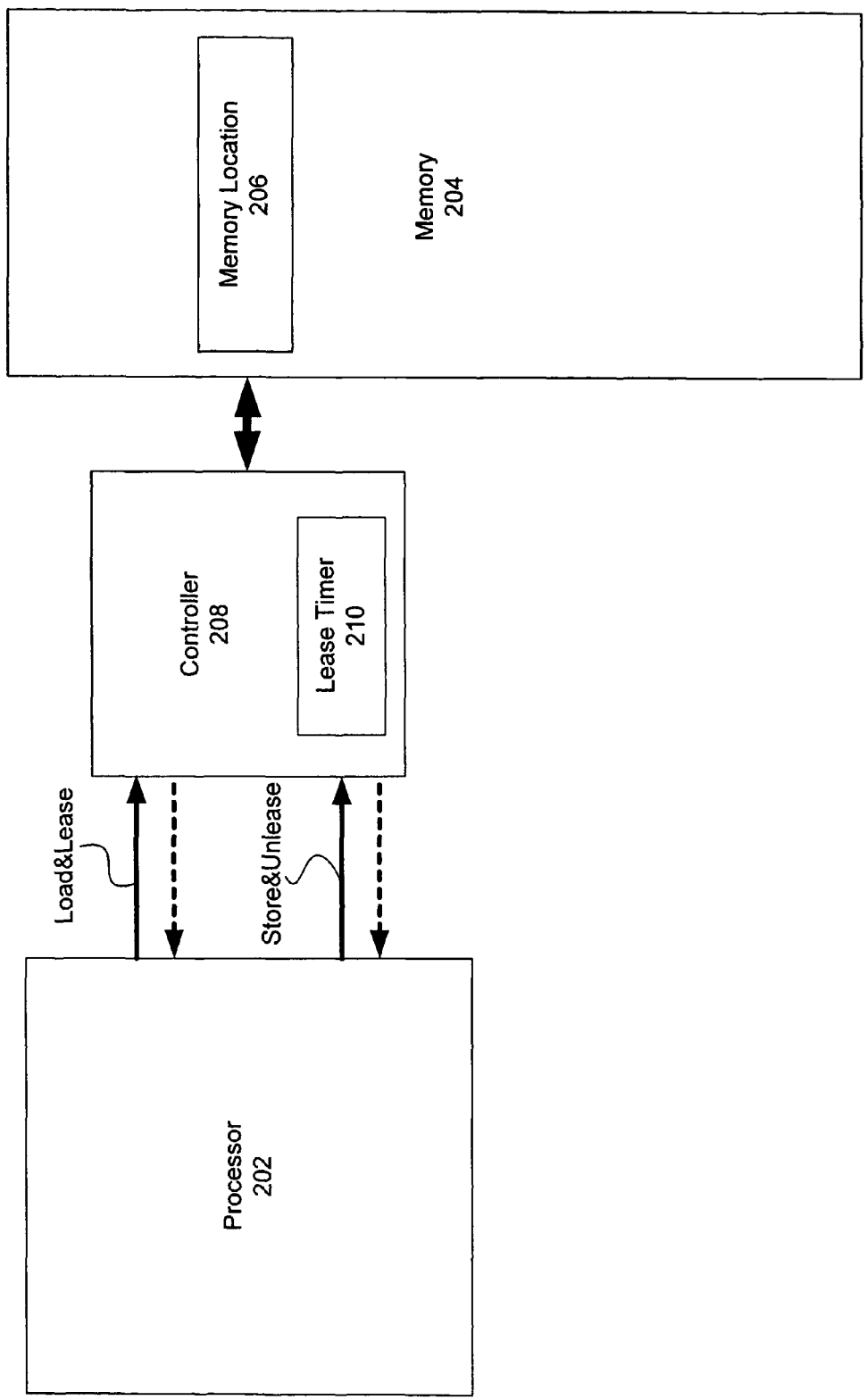
FIG. 4 shows a portion of a shared-memory multiprocessor system in accordance with an embodiment of the present invention.

FIG. 4 shows a portion of an exemplary shared-memory multiprocessor system in accordance with an embodiment of the present invention. When a processor (202) requires access to a particular memory location (206) in a shared-memory (204), the processor (202) issues a Load&Lease request to a controller (208) configured to control access to that particular memory location (206). The Load&Lease request loads the value of the memory location (206) and starts a lease timer (210) on the controller (208). In one or more embodiments of the present invention, a Load&Lease request on an unleased location always succeeds, but must fail if the memory location is already leased.

After the processor (202) manipulates the loaded value obtained in response to the invocation of the Load&Lease request, the processor (202) issues a Store& Unlease request to store the manipulated value back to the location (206) and unlease the memory location (206). In one or more embodiments of the present invention, a Store&Unlease request to a leased memory location succeeds if the Store& Unlease request is executed in time by the leasing process, but may fail if the lease on the memory location (206) has expired prior to the Store&Unlease request arrival at the controller. Thus, following a Load&Lease request, the lease on a memory location is released due to either a Store&Unlease request being issued prior to expiration of a particular amount of time (i.e., a "lease period") or the particular amount of time elapsing prior to the Store&Unlease or Unlease request.

While the processor (202) has a valid memory lease, i.e., the lease interval has not expired, the processor (202) has authorization to read and store data in the memory location (206) specified by the memory lease. Therefore, if another process (not shown in FIG. 4) attempts to read and/or store data to a memory location (206) by way of a memory lease, the other process is notified by the controller (208) (or "owner" processor (202)) that the memory location (206) is not available.

In one or more embodiments of the present invention, a plurality of independent controllers are used to each control access to a predetermined set (or "collection") of memory locations in a memory shared in a multiprocessor system.

In one embodiment of the present invention, a predetermined set of memory locations may include consecutively addressed memory locations. In one or more other embodiments of the present invention, a predetermined set of memory locations may include a set of cache locations in a cache line. In one or more other embodiments of the present invention, a predetermined set may include just a single memory location. Thus, references to a set of memory locations may refer to a set of memory instructions having only one memory location.

Further, in one or more embodiments of the present invention, at least some of the functionality of the controllers described above may be implemented using a bus shared by a plurality of processors.

Those skilled in the art will recognize that Load&Lease and Store&Unlease operations described in accordance with one or more embodiments of the present invention may be used as universal synchronization operations that may be used for non-blocking Read-Modify-Write operation support (universal operations are operations that may be used to support or implement any concurrent object in a nonblocking manner). Further, unlike typical Read-Modify-Write operations, Load&Lease and Store&Unlease operations are non-optimistic in that they ensure that other processes do not access a particular memory location during a particular amount of time dedicated to a process having access to the particular memory location. However, because the exclusive ownership of a memory location cannot last longer than a predetermined amount of time, Load&Lease and Store&Unlease operations may be used to provide non-blocking synchronization support.

As described above, a memory lease provides access to a particular memory location for a lease interval. One of ordinary skill in the art will appreciate that the lease interval may be determined in a variety of ways. For example, the lease interval may be static, variable (dynamic), upper bounded, lower bounded, ranged, etc. In one or more embodiments of the present invention, the duration of the lease interval may be based on a variety of factors, e.g., concurrency, congestion patterns, distance between a processor and a particular memory location, in addition to other local dynamic parameters. While the lease interval may be set by the programmer, the lease interval may also be generated by the compiler and run-time system, and/or updated dynamically during execution.

Figure 5:
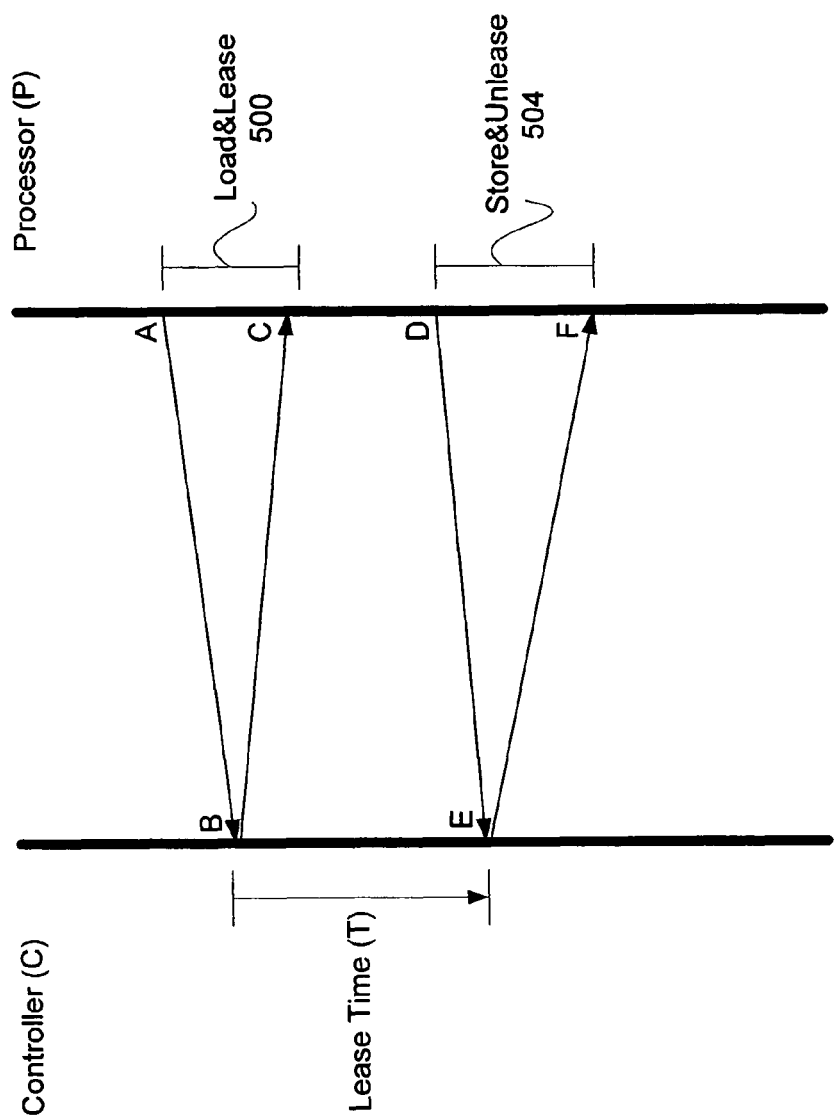
FIG. 5 shows a timing diagram in accordance with an embodiment of the present invention.

FIG. 5 shows an exemplary timing diagram in accordance with an embodiment of the present invention. As shown in FIG. 5, predetermined lease time (T) is started, or "clocked," in response to a Load&Lease request from a processor (P) to a controller (C) (arrow from A to B). In response, the controller (C) sends an acknowledgment signal to the processor (P) indicating that a memory lease has been obtained (arrow from B to C).

After some period of time, the processor (P) issues a Store&Unlease request to the controller (C) (arrow from D to E). As shown in FIG. 5, the Store&Unlease request is issued to the controller (C) prior to the expiration of predetermined lease time (T), and thus, the value is stored to the memory location, the memory lease is terminated, and the controller (C) sends an acknowledgement signal to the processor (P) indicating the success of the Store&Unlease operation (arrow from E to F). However, in one or more other embodiments of the present invention, if predetermined least time (T) expires prior to the Store& Unlease request, the controller (C) gets a timeout and removes or terminates the memory lease on the memory location.

Further, those skilled in the art will recognize that the predetermined lease time (T) may be set to be longer than the time it takes for messages involved in synchronization operations to travel between processor and memory.

Figure 6:
FIG. 6 shows a structure of a request in accordance with an embodiment of the present invention.
Figure 7:
FIG. 7 shows a structure of a response in accordance with an embodiment of the present invention.

FIGS. 6 and 7 respectively show exemplary structures of a request (e.g., Load&Lease and Store&Unlease requests) and a response in accordance with one or more embodiments of the present invention. In FIG. 6, a structure of a request (700) includes several fields, such, as, for example, an operation field (702), an address field (704), a processor field (706), a context field (708), a precondition field (710), a lease time field (712), and a value field (714). The operation field (702) indicates whether the request is a loading operation, a storing operation, or a non-operation (commonly referred to as a "no-op"). The address field (704) indicates the particular location in the memory being a ccessed. The processor field (706) identifies the owning processor. The context field (708) specifically identifies the thread to which the request belongs. The precondition field (710) specifies a required preliminary status of the lease (i.e., leased or unleased). The lease time field (712) indicates the amount of time as recommended by the processor (or controller) for the lease interval. The value field (714) indicates the value to be stored to the memory location identified by the address field (704).

In FIG. 7, a structure of a response (800) from, for example, a memory controller, includes several fields such as, for example, a success field (802), an address field (804), a context field (806), a leasing boolean field (808), and a value field (810). The success field (802) indicates whether the request was successfully executed. Similar to that of the request (700), the address field (804) and the context field (806) of the response (800) identify the particular location in memory being accessed and the specific executing thread, respectively. The leasing boolean field (808) indicates whether the response (800) is in response to a loading or storing operation. The value field (810) indicates the value being loaded or stored to the memory location indicated by the address field (804).

In one or more embodiments of the present invention, Load&Lease and Store&Unlease requests for loading and storing operations, respectively, may have a variety of structures. For example, the requests may have more, fewer, and/or different fields than those described above with reference to FIGS. 6 and 7.

In one or more embodiments of the present invention, other primitive instructions may be implemented in transient blocking synchronization. For example, a conditional loading operation (LoadIfUnleased) or a conditional storing operation (StoreIfUnleased) may be implemented. These operations load or store, respectively, on condition that the memory location is available, without acquiring a memory lease. Additionally, an unleasing operation (Unlease) may be implemented to request that a particular memory location be unleased. Further, in one or more embodiments of the present invention, the semantics of an instruction set used to implement transient blocking synchronization may be trap-based, meaning that failing instructions cause the processor to trap instead of, for example, returning failure code.

In order to keep track of events occurring on a shared-memory, a controller (e.g., (208) in FIG. 4) maintains a lease table as exemplarily shown in FIG. 8. The lease table (900) includes several entries such as, for example, an address field (902), a processor field (904), a thread context field (906), a timeout field (908), a waiting processor field (910), a waiting context field (912), a waiting timeout field (914), a waiting operation field (916), and a waiting value field (918). The address field (902) includes information relating to the address of a particular memory lease. The processor field (904) indicates the owning processor of a particular lease. The thread context field (906) identifies the specific thread to which a request belongs. The timeout field (908) indicates the value of the local clock at which the memory lease is to be revoked. The remaining fields, i.e., the waiting fields (910, 912, 914, 916, 918), are used for the corresponding parameters of a waiting operation to be carried out when a current memory lease is terminated. Incoming requests are matched by a subset of parameters, for example, the address, processor, and thread context fields. Those skilled in the art will appreciate that because memory leases are terminable, the size of the tables may be kept to a small, fixed size.

In one or more embodiments of the present invention, in the event that a lease table becomes full, any additional Load&Lease requests may be caused to fail.

In one or more embodiments of the present invention, Load&Lease operations on a particular memory location up to a predetermined number may queue up, in which case, a controller sends a response to the appropriate processor only once a given Load&Lease request acquires a lease. In the case of overflow, a Load&Lease request may be caused to fail. Those skilled in the art will appreciate that such embodiments of the present invention may allow for "tight" scheduling on the controller, may reduce the number of retries of Load&Lease requests, and may be compatible with the context switching of threads to hide latency.

Advantages of the present invention may include one or more of the following. In one or more embodiments of the present invention, transient blocking synchronization may provide robustness and tolerance for large-scale multiprocessor computer systems.

In one or more embodiments of the present invention, embodiments of the present invention may be implemented in software, hardware, or a combination thereof.

In one or more embodiments of the present invention, a read-modify-write operation on a memory location in a set of memory locations may be synchronized in that, for a predetermined amount of time, the set of memory locations is restricted.

In one or more embodiments of the present invention, Load&Lease and Store&Unlease operations may be used as universal synchronization operations that may be used for non-blocking Read-Modify-Write operation support In one or more embodiments of the present invention, transient blocking synchronization may not be dependent on specific communication architectures or cache coherence protocols to achieve synchronization.

In one or more embodiments of the present invention, transient blocking synchronization may provide a simple, inexpensive, and/or efficient synchronization implementation.

In one or more embodiments of the present invention, transient blocking synchronization being transient in nature may prevent system deadlocking, because, even though the memory lease provides exclusive ownership, the memory leases are only available for a limited duration.

In one or more embodiments of the present invention, transient blocking synchronization may allow for immediate ("up-front") instruction failing, which may reduce unnecessary computation.

In one or more embodiments of the present invention, transient blocking synchronization may allow for a relatively small, bounded table in a controller, thereby providing "tight" scheduling of operations conducive for fast context switching.

In one or more embodiments of the present invention, transient blocking synchronization operations may have simple and efficient non-blocking implementations in hardware.

In one or more embodiments of the present invention, transient blocking synchronization operations may be semantically strong enough to implement efficient non-blocking multi-word synchronization mechanisms.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system, comprising:
    a first processor and a second processor capable of executing processes concurrently;
    a set of memory locations shared by the first processor and the second processor;
    a lease table configured to maintain an entry comprising information for a request, wherein the request is issued by the first processor to perform a read-modify-write operation on a memory location in the set of memory locations, wherein the entry comprises a predetermined amount of time; and
    a controller configured to control access to the memory location based on the entry in the lease table,
    wherein, in response to the request by the first processor, the memory location is restricted from being accessed by the second processor for the predetermined amount of time,
    wherein the predetermined amount of time elapses prior to completion of the read-modify-write operation on the memory location by the first processor,
    wherein the second processor is permitted to access the memory location after the predetermined amount of time elapses,
    wherein the first processor continues the read-modify-write operation on the memory location to obtain a result after the predetermined amount of time elapses, and
    wherein the first processor is not permitted to store the result to the memory location.

2. The computer system of claim 1, wherein the first processor repeats the request to perform the read-modify-write operation.

3. The computer system of claim 1, wherein the entry further comprises at least one selected from the group consisting of an address entry, a processor entry, a thread context entry, a waiting processor entry, a waiting context entry, a waiting timeout entry, a waiting operation entry, and a waiting value entry.

4. A shared-memory multiprocessor computer system having instructions for synchronizing operations on memory, the instructions comprising instructions to:
- request access to a memory location in a set of memory locations by a first processor, wherein the set of memory locations is shared by the first processor and a second processor, and wherein the second processor is restricted from accessing the memory location for a predetermined amount of time based on the request; and
- perform a read-modify-write operation by the first processor on the memory location,
- wherein the predetermined amount of time elapses prior to completion of the read-modify-write operation on the memory location by the first processor,
- wherein the second processor is permitted to access the memory location after the predetermined amount of time elapses,
- wherein the first processor completes the read-modify-write operation on the memory location to obtain a result after the predetermined amount of time elapses, and
- wherein the first processor is not permitted to store the result to the memory location.

5. The shared-memory multiprocessor computer system of claim 4, further comprising instructions to:
- send an acknowledgement signal from a controller to the first processor indicating success of the store request when the read-modify-write operation completes within the predetermined amount of time.

6. A method of performing computer system operations, comprising:
- accessing a value in a memory location in a set of memory locations by a first process executed by a first processor, wherein the set of memory locations is shared by the first processor and a second processor;
- restricting a second process executed by the second processor from accessing the memory location for a predetermined amount of time based on the accessing by the first process; and
- performing a read-modify-write operation on the memory location by the first process, wherein the predetermined amount of time elapses prior to completion of the read-modify-write operation on the memory location by the first process;
- permitting the second process to access the memory location after the predetermined amount of time elapses;
- obtaining a result, by the first process, of the read-modify-write operation on the memory location after the predetermined amount of time elapses; and
- denying a request to store the result to the memory location, issued by the first process.

7. A computer system, comprising:
- a plurality of processors comprising a first processor and a second processor;
- a memory shared by the plurality of processors, the memory having a set of memory locations;
- a lease table configured to maintain an entry comprising information for a request, wherein the request is issued by the first processor to perform a read-modify-write operation on a memory location in the set of memory locations, wherein the entry comprises a predetermined amount of time; and
- a controller configured to:
  - in response to the request by the first processor, selectively grant the first processor access to the memory location for the predetermined amount of time, and
  - restrict the second processor from accessing the memory location during the predetermined amount of time,
- wherein the predetermined amount of time elapses prior to completion of the read-modify-write operation on the memory location by the first processor,
- wherein the second processor is permitted to access the memory location after the predetermined amount of time elapses,
- wherein the first processor completes the read-modify-write operation on the memory location to obtain a result after the predetermined amount of time elapses, and
- wherein the first processor is not permitted to store the result to the memory location.

8. The computer system of claim 7, wherein the entry further comprises at least one selected from the group consisting of an address entry, a processor entry, a thread context entry, a waiting processor entry, a waiting context entry, a waiting timeout entry, a waiting operation entry, and a waiting value entry.

9. The computer system of claim 7, wherein the controller is part of a bus shared by the plurality of processors.

* * * * *

UNITED STATES PATENT AND TRADEMARK OFFICE
CERTIFICATE OF CORRECTION

| | |
|---|---|
| PATENT NO. | : 8,219,762 B1 |
| APPLICATION NO. | : 10/918062 |
| DATED | : July 10, 2012 |
| INVENTOR(S) | : Nir N. Shavit et al. |

It is certified that error appears in the above-identified patent and that said Letters Patent is hereby corrected as shown below:

In the Claims

At column 9, claim 4, line 19, "wherein the first processor completes" should read "wherein the first processor continues".

At column 10, claim 7, line 30, "wherein the first processor completes" should read "wherein the first processor continues".

Signed and Sealed this
Eighth Day of July, 2014

Michelle K. Lee
*Deputy Director of the United States Patent and Trademark Office*